(12) United States Patent
Williams, III et al.

(10) Patent No.: US 9,088,414 B2
(45) Date of Patent: Jul. 21, 2015

(54) ASYNCHRONOUS IDENTITY ESTABLISHMENT THROUGH A WEB-BASED APPLICATION

(75) Inventors: Sam Franklin Williams, III, Seattle, WA (US); Michael Peter Vandekerkhof, Woodinville, WA (US); Jeremy Scott Barton, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 679 days.

(21) Appl. No.: 12/475,616

(22) Filed: Jun. 1, 2009

(65) Prior Publication Data

US 2010/0306668 A1    Dec. 2, 2010

(51) Int. Cl.
| | |
|---|---|
| G06F 3/00 | (2006.01) |
| G06F 3/048 | (2013.01) |
| G06F 3/0481 | (2013.01) |
| G06F 7/04 | (2006.01) |
| G06F 9/44 | (2006.01) |
| G06F 15/16 | (2006.01) |
| G06F 17/30 | (2006.01) |
| G06F 21/41 | (2013.01) |
| H04L 29/06 | (2006.01) |
| H04L 29/08 | (2006.01) |
| H04L 9/32 | (2006.01) |

(52) U.S. Cl.
CPC .............. *H04L 9/32* (2013.01); *H04L 63/0807* (2013.01); *H04L 29/0809* (2013.01)

(58) Field of Classification Search
CPC ... H04L 63/0815; H04L 67/14; G06F 3/0481; G06F 9/4443; G06F 21/41

USPC .................... 715/741, 742, 781; 726/7, 8, 10; 709/227–229
See application file for complete search history.

(56) References Cited

U.S. PATENT DOCUMENTS

| | | | | |
|---|---|---|---|---|
| 5,907,621 | A | * | 5/1999 | Bachman et al. .............. 713/155 |
| 5,928,363 | A | * | 7/1999 | Ruvolo ........................... 726/22 |
| 6,092,196 | A | | 7/2000 | Reiche |
| 6,240,414 | B1 | * | 5/2001 | Beizer et al. .......................... 1/1 |
| 6,438,600 | B1 | * | 8/2002 | Greenfield et al. ........... 709/229 |

(Continued)

OTHER PUBLICATIONS

"How to Select an SSL VPN for Remote Access to Microsoft SharePoint Portal Server 2007", Retrieved at <<http://download.microsoft.com/download/F/0/2/F0229C11-B47E-4002-A444-60207C6E11F5/SSL%20VPN%20for%20SharePoint-WP-200702.doc>>, Feb. 2007, pp. 17.

(Continued)

*Primary Examiner* — Eric J Bycer
(74) *Attorney, Agent, or Firm* — Steve Crocker; Danielle Johnston-Holmes; Micky Minhas

(57) ABSTRACT

A determination is made as to whether a user has been logged off from the web-based application accessed through a web browser on a computer. If it is determined that the user has been logged off from the web-based application, then a new user interface is provided through the web browser. The new user interface may enable the user to enter user credentials. The user credentials are received through the new user interface. A request to validate the user based on the user credentials is transmitted. Upon transmitting the request to validate the user, an instruction to remove the new user interface is received when the user is validated. Upon receiving the instruction, a display of the web-based application is transformed by removing the new user interface.

15 Claims, 4 Drawing Sheets

(56) References Cited

U.S. PATENT DOCUMENTS

| | | | |
|---|---|---|---|
| 6,609,198 B1* | 8/2003 | Wood et al. | 713/155 |
| 6,812,938 B2* | 11/2004 | Pinnell | 715/741 |
| 6,950,980 B1* | 9/2005 | Malcolm | 715/207 |
| 7,146,563 B2* | 12/2006 | Hesmer et al. | 715/223 |
| 7,209,969 B2 | 4/2007 | Lahti et al. | |
| 7,249,314 B2* | 7/2007 | Walker et al. | 715/205 |
| 7,293,098 B2 | 11/2007 | Sandhu et al. | |
| 7,318,234 B1 | 1/2008 | Dharmarajan | |
| 7,475,421 B2 | 1/2009 | Abdo et al. | |
| 7,540,020 B1* | 5/2009 | Biswas et al. | 726/6 |
| 2001/0037469 A1* | 11/2001 | Gupta et al. | 713/202 |
| 2002/0029269 A1* | 3/2002 | McCarty et al. | 709/225 |
| 2003/0105981 A1* | 6/2003 | Miller et al. | 713/202 |
| 2003/0110266 A1* | 6/2003 | Rollins et al. | 709/227 |
| 2003/0132958 A1* | 7/2003 | Himmel et al. | 345/745 |
| 2003/0182551 A1* | 9/2003 | Frantz et al. | 713/170 |
| 2003/0200465 A1* | 10/2003 | Bhat et al. | 713/202 |
| 2003/0233361 A1* | 12/2003 | Cady | 707/10 |
| 2004/0003081 A1* | 1/2004 | Justus et al. | 709/225 |
| 2004/0111644 A1* | 6/2004 | Saunders et al. | 713/202 |
| 2004/0193941 A1* | 9/2004 | Barr et al. | 714/4 |
| 2004/0199794 A1* | 10/2004 | Philips et al. | 713/202 |
| 2004/0250118 A1* | 12/2004 | Andreev et al. | 713/201 |
| 2005/0055642 A1* | 3/2005 | Chen et al. | 715/753 |
| 2005/0108654 A1* | 5/2005 | Gopalraj | 715/791 |
| 2005/0125677 A1* | 6/2005 | Michaelides | 713/185 |
| 2005/0198565 A1* | 9/2005 | McChrystal | 715/511 |
| 2005/0234943 A1* | 10/2005 | Clarke | 707/100 |
| 2005/0240773 A1* | 10/2005 | Hilbert et al. | 713/182 |
| 2006/0075110 A1* | 4/2006 | Seraphin | 709/227 |
| 2006/0265740 A1* | 11/2006 | Clark et al. | 726/8 |
| 2007/0016943 A1* | 1/2007 | M'Raihi et al. | 726/9 |
| 2007/0067444 A1* | 3/2007 | McCarty et al. | 709/224 |
| 2007/0115845 A1* | 5/2007 | Hochwarth et al. | 370/252 |
| 2007/0180048 A1 | 8/2007 | Crick et al. | |
| 2007/0198657 A1* | 8/2007 | Saliba et al. | 709/219 |
| 2008/0046983 A1* | 2/2008 | Lester et al. | 726/5 |
| 2008/0177782 A1* | 7/2008 | Poston et al. | 707/102 |
| 2008/0178117 A1* | 7/2008 | Gelman et al. | 715/808 |
| 2008/0256616 A1* | 10/2008 | Guarraci et al. | 726/9 |
| 2009/0064173 A1 | 3/2009 | Goldspink et al. | |
| 2009/0172792 A1* | 7/2009 | Backhouse | 726/6 |
| 2010/0169269 A1* | 7/2010 | Chandrasekaran | 707/608 |

OTHER PUBLICATIONS

"Chapter 2 Building the Deployment Architecture", Retrieved at <<http://docs.sun.com/app/docs/doc/820-3746/adqcz?l=en&a=view&q=session+regeneration>>, Mar. 31, 2009, pp. 9.

"Session State Page", Retrieved at <<http://technet.microsoft.com/en-us/library/cc754849.aspx>>, Mar. 31, 2009, pp. 3.

"Session Management Schemes", Retrieved at <<http://www.cgisecurity.com/owasp/html/ch07s03.html>>, Mar. 31, 2009, pp. 1-2.

* cited by examiner

ASYNCHRONOUS IDENTITY ESTABLISHMENT THROUGH A WEB-BASED APPLICATION

BACKGROUND

Web-based applications may be provided on a server computer and accessed by a client computer via a web browser. Some web-based applications are publicly-accessible without restriction, while other web-based applications implement an authentication procedure whereby access is limited to those who can be successfully authenticated. A conventional authentication procedure may request that a user enters a login identifier and a corresponding password. The web-based application may then communicate with an authentication server, which authenticates the user based on the login identifier and the password.

An example of a web-based application is a web-based productivity application. Web-based productivity applications may include word processing applications, spreadsheet applications, presentation applications, electronic mail applications, unstructured collaborative authoring applications, and the like. In the case of web-based productivity applications, the authentication procedure may function as a security feature that restricts access to a document to certain people. For example, if a first user creates a document and saves the document onto the server computer, the authentication procedure may prevent a second user from accessing the document.

When a user initially accesses a document through the web browser, the web browser may display an editing surface containing the document. As the user edits the document by adding content and removing content, the web browser may or may not continue communicating with the web-based productivity application. If the web browser does not communicate with the web-based productivity application for a sufficient period of time, the web-based productivity application may lose the user authentication through, for example, a timeout or some other intervening action. The web-based productivity application may then provide the user with an option to re-authenticate by reentering the login identifier and password. However, the user may lose any changes made to the document since the last save of the document. In particular, re-authenticating the user may involve a full-page navigation away from the web page containing the changes. The user may become very frustrated over the web-based application if significant portions of a document are lost.

It is with respect to these and other considerations that the disclosure made herein is presented.

SUMMARY

Technologies are described herein for asynchronously establishing identity through a web-based application. According to one embodiment, a method is provided herein for establishing identity through a web-based application. According to the method, a determination is made as to whether a user has been logged off from the web-based application accessed through a web browser on a computer. If it is determined that the user has been logged off from the web-based application, then a new user interface is provided through the web browser. The new user interface may enable the user to enter user credentials. The issuer credentials are received through the new user interface. A request to validate the user based on the user credentials is transmitted. Upon transmitting the request to validate the user, an instruction to remove the new user interface is received when the user is validated. Upon receiving the instruction, a display of the web-based application is transformed by removing the new user interface.

It should also be appreciated that the above-described subject matter may also be implemented as a computer-controlled apparatus, a computer process, a computing system, or as an article of manufacture such as a computer-storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all of the disadvantages noted in any part of this disclosure.

DETAILED DESCRIPTION

The following detailed description is directed to technologies for asynchronously establishing identity through a web-based application. Through the utilization of the technologies and concepts presented herein, an identity reestablishment code may monitor whether a user has been logged off from his or her session with a web-based application. When the identity reestablishment code determines that that the user has been logged off from his or her session with the web-based application, the identity reestablishment code may provide an identity reestablishment interface whereby the user can enter user credentials in order to reestablish his or her identity. Examples of user credentials may include, but are not limited to, a username and password, a smartcard and associated personal identification number ("PIN"), a client authentication certificate, biometric encoding, and the like. The identity reestablishment interface may be displayed within a new user interface, such as a new window. In some instances, the identity reestablishment code may also "silently" reestablish the identity of the user.

An authentication server may verify whether the user credentials are valid. When the authentication server determines that the user credentials are valid, the authentication server may generate a new authentication token and transmit the new authentication token to the user's computer. The authentication server may also direct the new user interface to another web page, which may notify the identity reestablishment code that the user has been properly authenticated. As a result, the identity reestablishment code may remove the new user interface.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
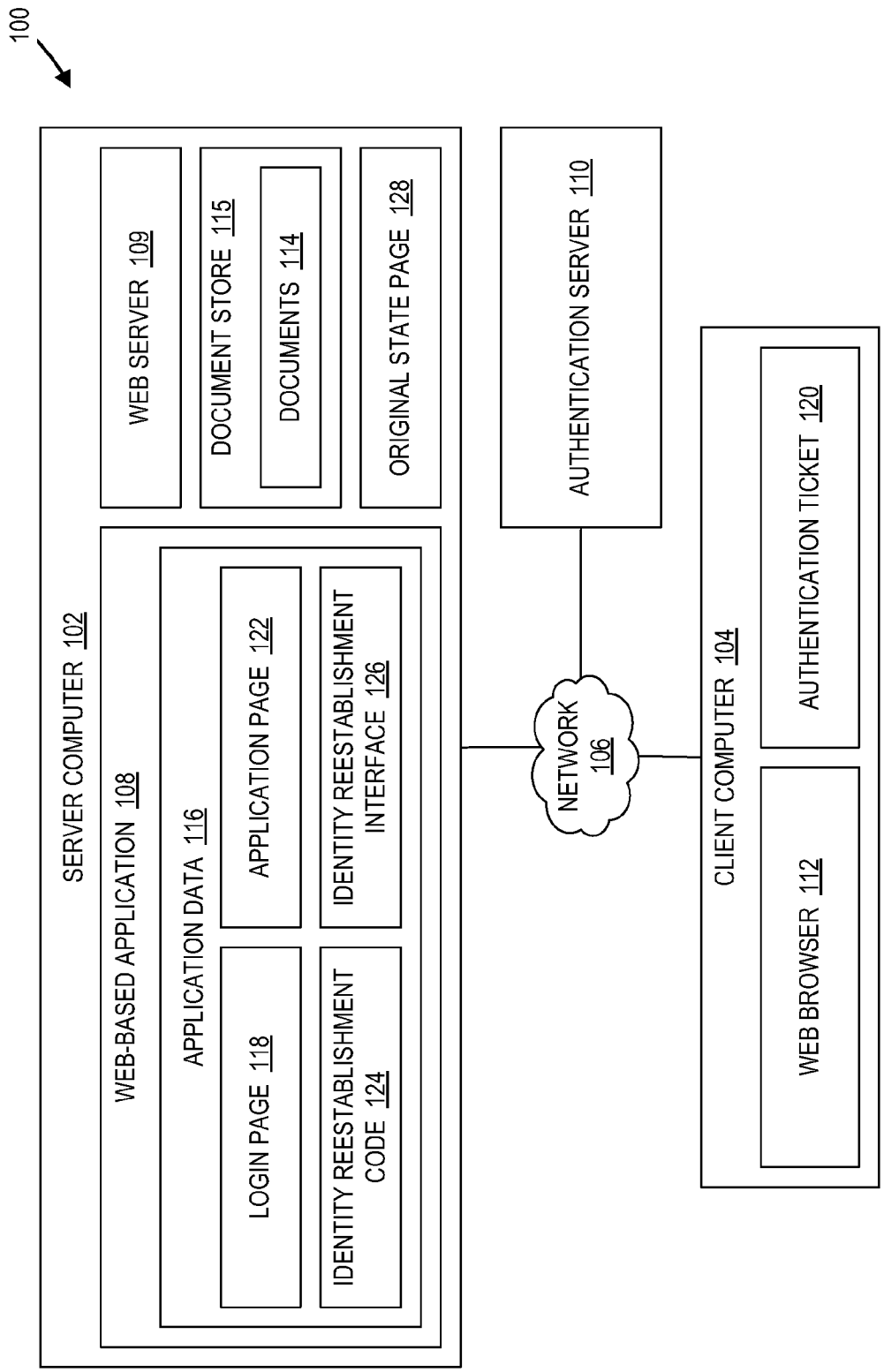
FIG. 1 is a computer architecture diagram showing illustrative computer architectures configured to establish identity through a web-based application, in accordance with embodiments.

In the following detailed description, references are made to the accompanying drawings that form a part hereof, and which are shown by way of illustration specific embodiments or examples. Referring now to the drawings, in which like numerals represent like elements through the several figures, a computing system and methodology for asynchronously establishing identity through a web-based application will be described. In particular, FIG. 1 illustrates computer architectures 100 including at least one server computer 102 and at least one client computer 104 coupled to a network 106. The server computer 102 may include at least one web-based application 108, a web server 109, and an authentication server 110. The client computer 104 may include a web browser 112 configured to remotely access the web-based application 108 through the network 106. The web-based application 108 may be implemented with cross-browser runtime technology, such as JAVA from SUN MICROSYSTEMS, FLASH from ADOBE SYSTEMS, Asynchronous JavaScript and XML ("AJAX"), or other suitable runtime technologies.

In some embodiments, the web-based application 108 may include web-based productivity applications. Examples of web-based productivity applications may include word processing applications, spreadsheet applications, presentation applications, electronic mail applications, unstructured collaborative authoring applications, and the like. Other types of web-based applications 108 may be similarly utilized as contemplated by those skilled in the art. The web-based application 108 may provide, among other features, the ability to create, edit, save, load, and/or transmit one or more documents 114. The documents 114 may be saved to and retrieved from a document store 115. Examples of the documents 114 may include text documents, spreadsheets, presentations, electronic mail, and other suitable file content.

A user may access a particular web-based application in the web-based applications 108 by entering into the web browser 112 a uniform resource locator ("URL") pointing to the web-based application. When the user enters the URL into the web browser 112, the web browser 112 may request the web-based application 108 from the web server 109. The web server 109 may respond to the request by transmitting application data 116 to the web browser 112. For example, the application data 116 may include executable code, such as JAVA, FLASH, AJAX, or other suitable code. The web browser 112 may read and execute the application data 116 and render local representations of one or more web pages enabling the user to, among other features, create, edit, save, load, and/or transmit the documents 114.

In order to control access the web-based application 108 and/or the documents 114, the web-based application 108 may implement an authentication mechanism. In an example, when the web browser 112 initially transmits the request for the web-based application 108 to the web server 109, the user has yet to be authenticated. As a result, the web server 109 may direct the web browser 112 to a login page 118.

The login page 118 may be configured to enable the user to enter and submit a login identifier and a corresponding password. Although embodiments described herein may refer to the user authenticating through a login identifier and password, it should be appreciated that the user may be authenticated through any suitable user credentials. When the user enters the login identifier and password in the login page 118, the web browser 112 may transmit the login identifier and password to the authentication server 110, which may be configured to verify the login identifier and password. If the login identifier and password are successfully validated, then the authentication server 110 may generate an authentication token 120 establishing a session between the web browser 112 and the web-based application 108. The authentication server 110 may then transmit the authentication token 120 to the client computer 104, which may store the authentication token 120. In some embodiments, the authentication token 120 may be embodied within a browser cookie.

In subsequent requests to the web server 109 to access the web-based application 108, the web browser 112 may transmit the authentication token 120 along with the request to the web server 109. Upon checking the authentication token 120, the web server 109 may direct the web browser 112 to an application page 122 in which a user can, among other features, create, edit, save, load, and/or transmit the documents 114. It should be appreciated that the authentication sequence described above is merely an example and is not intended to be limited. Other authentication sequences and protocols may be similarly utilized as contemplated by those skilled in the art.

As long as the authentication token 120 is available and exists, the web server 109 can handle subsequent requests to the web-based application 108 without having the user reenter the login identifier and password. However, various occurrences and/or user actions may erase or invalidate the authentication token 120. In some embodiments, the server computer 102 may maintain a timeout policy with which the web server 109 may determine whether the authentication token 120 is valid or expired. In particular, the timeout policy may specify a limited lifetime for the authentication token 120. The web server 109 may compare the age of the authentication token 120 with the limited lifetime specified by the timeout policy. If the age of the authentication token 120 is less than the limited lifetime specified by a timeout policy, then the web server 109 may deem the authentication token 120 to be valid. If the age of the authentication token 120 is greater than the limited lifetime specified by the timeout policy, then the web server 109 may deem the authentication token 120 to be expired and invalid. In this case, the user is logged off without a specific request from the user, so the user may be entirely unaware that she has been logged off. For the sake of simplicity, this type of log-off may be referred to herein as a "passive log off".

In further embodiments, the authentication token 120 may be shared by multiple web-based applications. For example, a family of web-based productivity applications may share the authentication token 120. Thus, when the user logs into one web-based application, the authentication token 120 that is generated for that web-based application may enable the user to access other web-based applications without reentering the login identifier and the password. However, when the user logs off of one web-based application, the web-based application may invalidate or erase the authentication token 120. As a result, when the user transmits a subsequent request to access another web-based application, the web server 109 may again direct the web browser 112 to the login page 118. In this case, the user is logged off in response to a specific request from the user, although the user may be unaware that logging off one web-based application results in logging off other web-based applications. For the sake of simplicity, this type of log-off may be referred to herein as an "active log off".

In the cases where the web browser 112 is redirected to the login page 118 as a result of a passive or active log off the web browser 112 may lose any content that the user has entered since the last save of the document. For example, the user may enter text into a text box corresponding to a document displayed in the application page 122. Prior to the user saving the document, a passive or active log off may occur causing the user to be logged off. When the user attempts to access the web-based application 108 again (e.g., to save the document), the web server 109 may see that the authentication token 120 is invalid or does not exist. As a result, the web server 109 may cause the web browser 112 to transition from the application page 122 to the login page 118. Any text that the user entered into the text box since the last save may be lost during this transition. In order to avoid this potential loss of content when the web browser 112 is directed to the login page 118, the application data 116 may further include identity reestablishment code 124.

According to embodiments, the identity reestablishment code 124 may be configured to cause the web browser 112 to periodically determine whether the authentication token 120 is valid. For example, the identity reestablishment code 124 may cause the web browser 112 to look for the authentication token 120 every few seconds. When the web browser 112 determines that the authentication token 120 is invalid or does not exist, the identity reestablishment code 124 may cause the web browser 112 to display an identity reestablishment interface 126. The identity reestablishment interface 126 may be displayed in a new user interface contained within or external to the window displaying the application page 122. The new user interface may or may not block access to the server-side representation of the application page 122 displayed in the web browser 112. For example, if the new user interface blocks access to the application page 122, then the user may be restricted from saving additional text into the application page 122 until the web browser 112 removes the new window. If the new user interface does not block access to the application page 122, then the user may save additional text entered into the local representation even after the identity reestablishment interface 126 is displayed.

The identity reestablishment interface 126 may be configured to enable the user to reenter the login identifier and password. When the user enters the login identifier and the password, the web browser 112 may transmit the login identifier and password to the authentication server 110. The authentication server 110 may then verify the login identifier and password. Upon verifying the login identifier and password, the authentication server 110 may generate a new authentication token, which is transmitted to the client computer 104 and stored on the client computer 104. The authentication server 110 may also direct the new window to an original state page 128. The original state page 128 may contain knowledge that the user was previously accessing the web-based application 108. The original state page 128 may instruct the web-based application 108 that the user has been successfully authenticated.

Upon receiving notification that the user has been successfully authenticated, the identity reestablishment code 124 may cause the web browser to "tear down" or remove the identity reestablishment interface 126. Subsequent requests for accessing the web-based application 108 may include the new authentication token, thereby avoiding the transition from the application page 122 to the login page 118. According to embodiments, the state of the application page 122 after the identity reestablishment interface 126 is removed may be the same as the state of the application page 122 prior to the user being logged off. That is, the user may not lose any content as a result of reestablishing his or her identity through the identity reestablishment interface 126.

In further embodiments, when the web server 109 deems the authentication token 120 to be expired and invalid, the web server 109 may "silently" (i.e., without notifying the user) re-authenticate the user without again directing the web browser 112 to the login page 118. For example, this silent re-authentication may occur after a passive log off. In particular, the web server 109 may request that the authentication server 110 issue a new authentication token to the client computer 104. Thus, in subsequent requests to the web server 109 to access the web-based application 108, the web browser 112 may transmit the new authentication token along with the request to the web server 109.

Figure 2B:
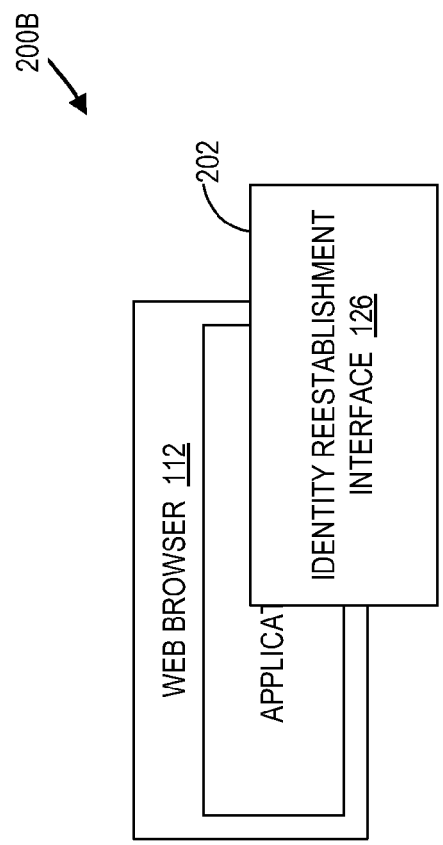
FIGS. 2A and 2B are user display diagrams showing example implementations of the web-based application, in accordance with embodiments.
Figure 2A:
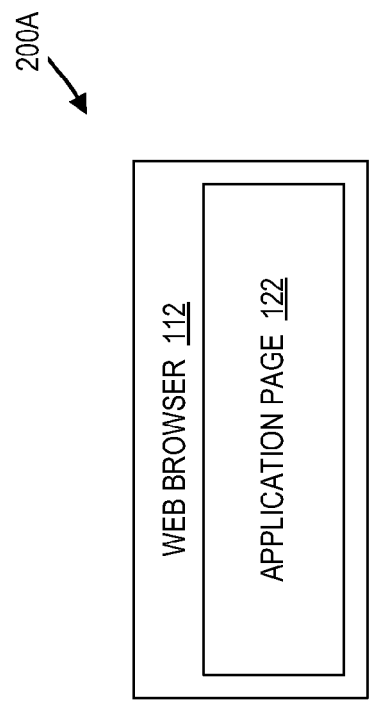

Referring now to FIGS. 2A and 2B, additional details regarding the identity reestablishment interface 126 will be described. In FIG. 2A, a user display diagram 200A is illustrated. The user display diagram 200A includes a representation of the web browser 112. In the examples shown, the user has accessed the application page 122 in the web-based application 108 within the web browser 112. For example, the user may have accessed the application page 122 through a suitable authentication mechanism whereby the authentication token 120 is generated.

At some point after the user initially accesses the application page 122 but before the user intends to log off from the web-based application 108, the user may experience a passive or active log off whereby the user is logged off from the web-based application 108. The identity reestablishment code 124 may discover that the user has been logged off from the web-based application 108. As a result, the identity reestablishment code 124 may open a new user interface 202, as illustrated in a user display diagram 200B in FIG. 2B. The new user interface 202 may or may not block user access to the application page 122. In an example, the new user interface 202 may be a new window.

The new user interface 202 may enable the user to enter a login identifier and a password. When the user enters the login identifier and password, the new user interface 202 may transmit the login identifier and password to the authentication server 110. If the authentication server 110 verifies the login identifier and password, then the authentication server 110 may direct the new user interface 202 to the original state page 128. The original state page 128 may notify the web-based application 108 that the user has been successfully authenticated. As a result, the web-based application 108 may remove the identity reestablishment interface 126, and the user may again access the web-based application 108. If the authentication server 110 does not verify the login identifier and password, then the authentication server 110 may transmit an error message to the new user interface. The new user interface 202 may then inform the user that access to the web-based application 108 may be restricted until the user is properly authenticated.

In some embodiments, prior to transmitting the login identifier and password to the authentication server 110, the new user interface 202 may verify whether the login identifier entered into the identity reestablishment interface 126 is the same as the login identifier that originally accessed the web-based application 108 before the passive or active log off. If the entered login identifier is the same as the original login identifier, then the new user interface 202 may transmit the entered login identifier and password to the authentication server 110. If the entered login identifier is different from the original login identifier, then the user interface 202 may display an error message indicating that the user that the entered login identifier is different from the original login identifier and that access to the web-based application 108 may be restricted until the user is properly authenticated.

In some embodiments, the new user interface 202 may also maintain a token indicating whether the remote document being edited through the application page 122 has been updated by another user. For example, the remote document may be concurrently edited by multiple users over the network 106. If the new user interface determines through the token that the remote document has been changed since the last time the user loaded the document, the new user interface 202 may prevent the user from using the web-based application 108 to modify the server-side representation of the document. However, the user may still be able to continue working on the local representation of the document through the web browser 112. The new user interface 202 may also display a message notifying the user to take preventative measures to save any content entered into the local representation of the application page 122.

Figure 3:
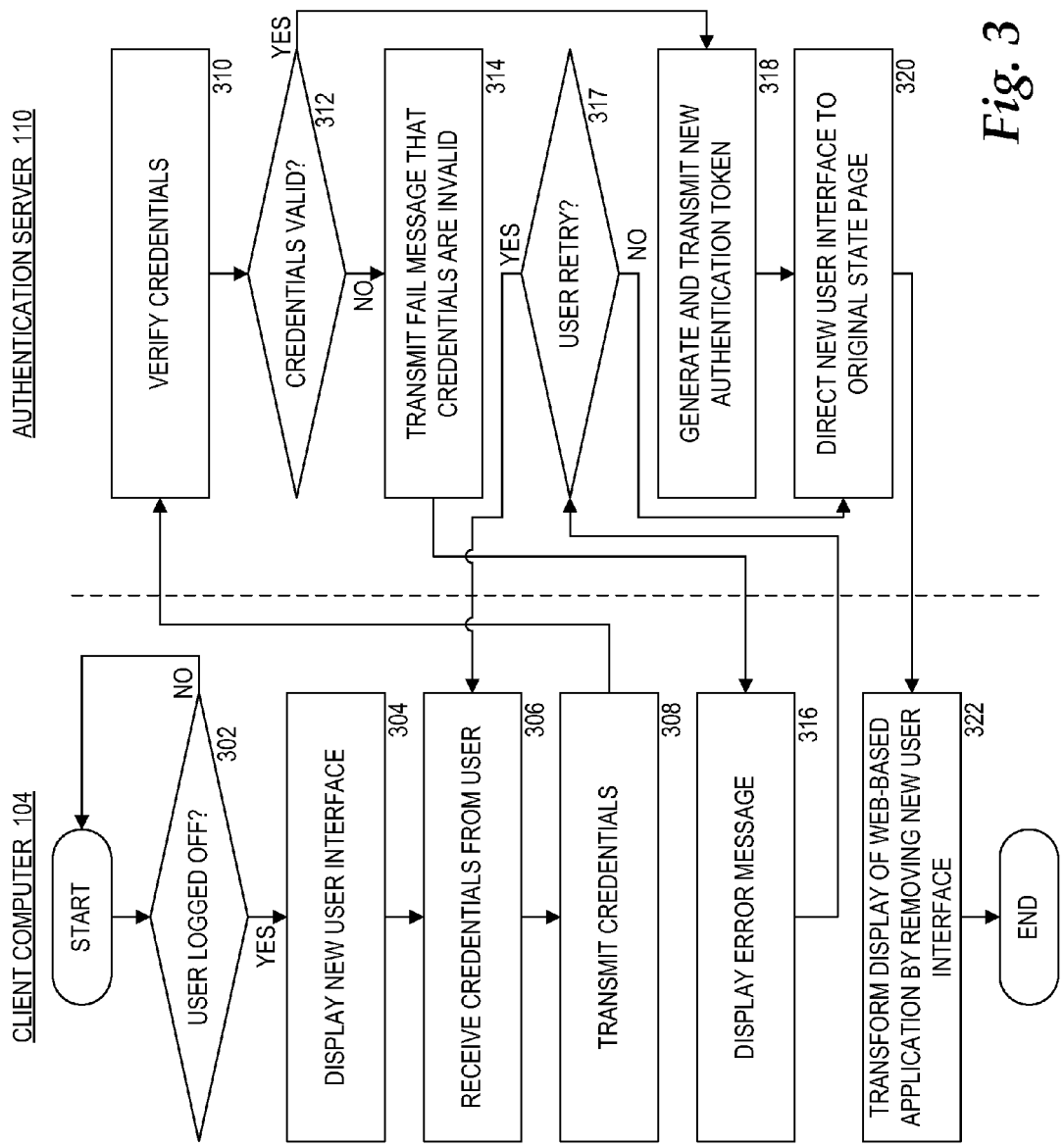
FIG. 3 is a flow diagram illustrating methods for establishing identity through a web-based application, in accordance with embodiments.

Referring now to FIG. 3, a flow diagram illustrating methods for establishing identity through the web-based application 108 is shown. In particular, the flow diagram of FIG. 3 illustrates a routine implemented between the client computer 104 and the authentication server 110. The client computer 104 is operating the web browser 112, which may be executing the application data 116 retrieved from the server computer 102. The operations of the server computer 102, the client computer 104, and the authentication server 110 as described herein are merely examples. Different components may be perform these operations as contemplated by those skilled in the art.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

In FIG. 3, a routine 300 begins at operation 302, where the identity reestablishment code 124, as executed by the web browser 112 on the client computer 104, determines whether the user has been logged off from his or her session with the web-based application 108. For example, the identity reestablishment code 124 may determine whether the authentication token 120 exists on the client computer 104 and whether the authentication token 120 is valid. The user may be logged off as a result of a passive or active log off, as previously described. The identity reestablishment code 124 may continue monitoring the authentication token 120 until a determination is made that the user has been logged off from his or her session with the web-based application 108. When the identity reestablishment code 124 determines that the user has been logged off from his or her session with the web-based application 108, the routine 300 proceeds to operation 304.

At operation 304, the identity reestablishment code 124 displays the new user interface 202. The new user interface 202 may be a new window that displays the identity reestablishment interface 126. In the alternative, the new user interface 202 may be displayed within the same window as the application page 122. The identity reestablishment interface 126 may enable the user to enter a login identifier and a password in order to reestablish his or her identity after being logged off. When the identity reestablishment code 124 provides the new user interface 202, the routine 300 proceeds to operation 306.

At operation 306, the identity reestablishment code 124 receives the login identifier and the password from the user through the identity reestablishment interface 126. The routine 300 then proceeds to operation 308, where the identity reestablishment code 124 transmits the login identifier and the password to the authentication server 110. For example, the identity reestablishment code 124 may transmit a request to validate the user based on the login identifier and the password. The routine 300 then proceeds to operation 310.

At operation 310, the authentication server 110 verifies whether the login identifier and the password are valid. If the authentication server 110 determines that the login identifier and the password are invalid, then the routine 300 proceeds to operation 314. At operation 314, the authentication server 110 transmits a fail message to the identity reestablishment code 124. The fail message may indicate that a failure occurred at the authentication server 110. The fail message may also indicate that the login identifier and password are invalid. The routine 300 then proceeds to operation 316, where upon receiving the fail message, the identity reestablishment code 124 displays an error message through the new user interface 202. The error message may relay to the user that the login identifier and/or the password are not valid.

When the error message is displayed, the routine 300 proceeds to operation 317, where the identity reestablishment code 124 receives an election regarding whether the user desires to retry entering the user credentials. For example, the identity reestablishment code 124 may display a dialog enabling the user to make such an election. If the user elects to re-enter the user credentials, then the routine 300 proceeds back to operation 306. If the user elects not to reenter the user credentials, then the routine 300 proceeds to operation 320, which "tears down" the new user interface, as described below.

If the authentication server 110 determines that the user credentials are valid, then the routine 300 proceeds to operation 318, where the authentication server 110 generates a new authentication token and transmits the new authentication token to the web browser 112. The web browser 112 may store the new authentication token on the client computer 104. The routine 300 then proceeds to operation 320, where the authentication server 110 directs the user interface to the original state page 128. The original state page 128 may contain instructions to remove the new user interface 202. Thus, the routine 300 proceeds to operation 322, where upon executing the original state page 128, the web browser 112 transforms the display of the web-based application 108 on the web browser 112 by removing the new user interface 202.

Figure 4:
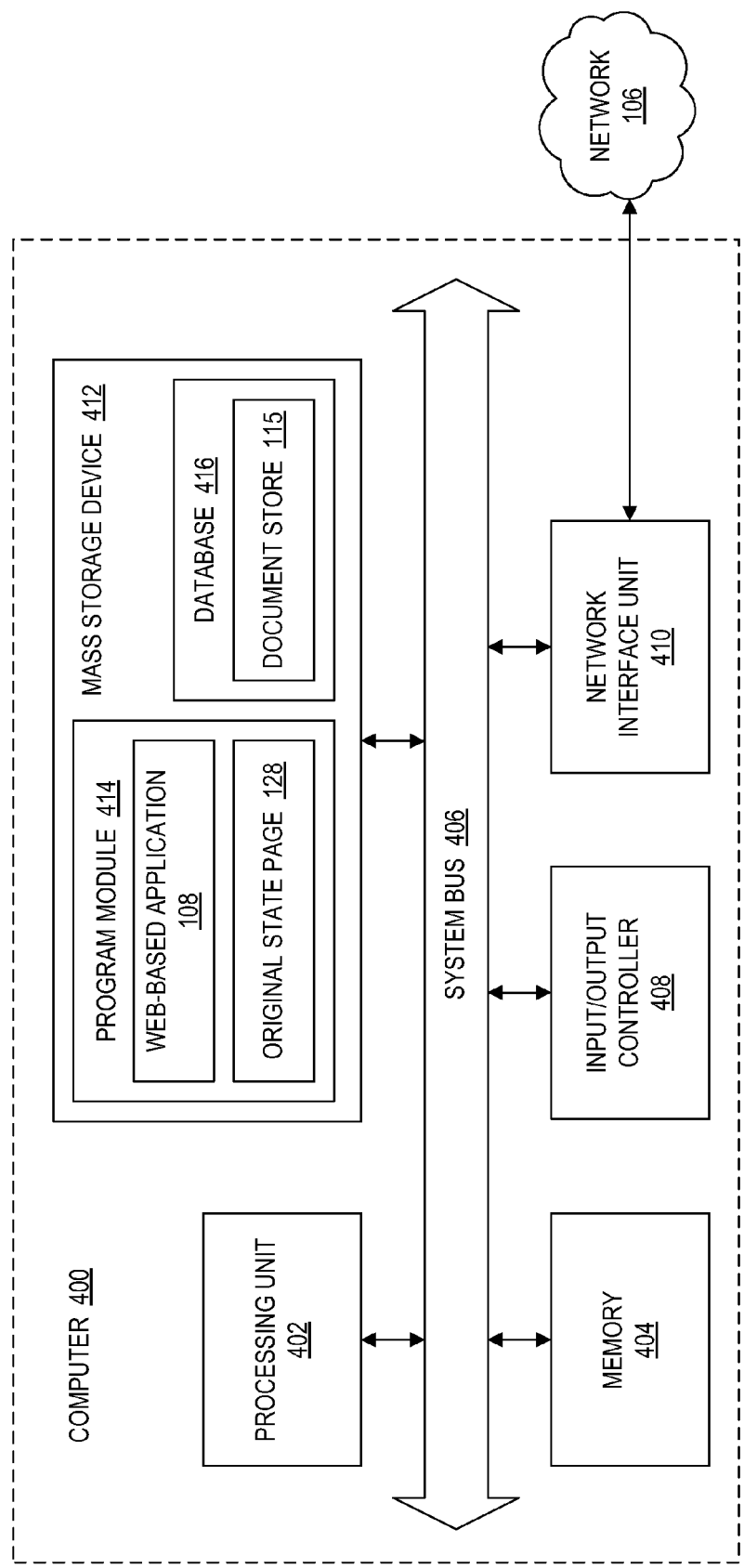
FIG. 4 is a computer architecture diagram showing illustrative computer hardware architectures for a computing system capable of implementing the embodiments presented herein.

Referring now to FIG. 4, an example computer architecture diagram showing a computer 400 is illustrated. An example of the computer 400 may include the server computer 102, the client computer 104, and the authentication server 110 of FIG. 1. The computer 400 may include a processing unit 402 ("CPU"), a system memory 404, and a system bus 406 that couples the memory 404 to the CPU 402. The computer 400 may further include a mass storage device 412 for storing one or more program modules 414 and one or more databases 416. Examples of the program modules 414 may include the web-based application 108 and the original state page 128. Examples of the databases 416 may include the document store 115. The mass storage device 412 may be connected to the CPU 402 through a mass storage controller (not shown) connected to the bus 406. The mass storage device 412 and its associated computer-storage media may provide non-volatile storage for the computer 400. Although the description of computer-storage media contained herein refers to a mass storage device, such as a hard disk or CD-ROM drive, it should be appreciated by those skilled in the art that computer-storage media can be any available computer storage media that can be accessed by the computer 400.

By way of example, and not limitation, computer-storage media may include volatile and non-volatile, removable and non-removable media implemented in any method or technology for storage of information such as computer-storage instructions, data structures, program modules, or other data. For example, computer-storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 400.

According to various embodiments, the computer 400 may operate in a networked environment using logical connections to remote computers through a network such as the network 106. The computer 400 may connect to the network 106 through a network interface unit 410 connected to the bus 406. It should be appreciated that the network interface unit 410 may also be utilized to connect to other types of networks and remote computer systems. The computer 400 may also include an input/output controller 408 for receiving and processing input from a number of input devices (not shown), including a keyboard, a mouse, a microphone, and a game controller. Similarly, the input/output controller 408 may provide output to a display or other type of output device (not shown).

The bus 406 may enable the processing unit 402 to read code and/or data to/from the mass storage device 412 or other computer-storage media. The computer-storage media may represent apparatus in the form of storage elements that are implemented using any suitable technology, including but not limited to semiconductors, magnetic materials, optics, or the like. The computer-storage media may represent memory components, whether characterized as RAM, ROM, flash, or other types of technology. The computer-storage media may also represent secondary storage, whether implemented as hard drives or otherwise. Hard drive implementations may be characterized as solid state, or may include rotating media storing magnetically-encoded information.

The program modules 414 may include software instructions that, when loaded into the processing unit 402 and executed, cause the computer 400 to establish identity through a web-based application. The program modules 414 may also provide various tools or techniques by which the computer 400 may participate within the overall systems or operating environments using the components, flows, and data structures discussed throughout this description. For example, the program modules 414 may implement interfaces for establishing identity through a web-based application.

In general, the program modules 414 may, when loaded into the processing unit 402 and executed, transform the processing unit 402 and the overall computer 400 from a general-purpose computing system into a special-purpose computing system customized to establish identity through a web-based application. The processing unit 402 may be constructed from any number of transistors or other discrete circuit elements, which may individually or collectively assume any number of states. More specifically, the processing unit 402 may operate as a finite-state machine, in response to executable instructions contained within the program modules 414. These computer-executable instructions may transform the processing unit 402 by specifying how the processing unit 402 transitions between states, thereby transforming the transistors or other discrete hardware elements constituting the processing unit 402.

Encoding the program modules 414 may also transform the physical structure of the computer-storage media. The specific transformation of physical structure may depend on various factors, in different implementations of this description. Examples of such factors may include, but are not limited to: the technology used to implement the computer-storage media, whether the computer-storage media are characterized as primary or secondary storage, and the like. For example, if the computer-storage media are implemented as semiconductor-based memory, the program modules 414 may transform the physical state of the semiconductor memory, when the software is encoded therein. For example, the program modules 414 may transform the state of transistors, capacitors, or other discrete circuit elements constituting the semiconductor memory.

As another example, the computer-storage media may be implemented using magnetic or optical technology. In such implementations, the program modules 414 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope of the present description, with the foregoing examples provided only to facilitate this discussion.

Based on the foregoing, it should be appreciated that technologies for establishing identity through a web-based application are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for a client computer for establishing identity through a web-based application, the computer-implemented method comprising computer-implemented operations for:
   allowing a user to log on to a web-based application provided by a server through a web browser executing on a client computer by allowing the user to enter user credentials, the web-based application having an authentication token;
   determining, by the client computer, whether the user has been logged off from the web-based application;
   responsive to determining that the user has been logged off from the web-based application, providing a new user interface through the web browser executing on the client computer without user initiation, the new user interface enabling the user to enter user credentials;
   receiving, by the client computer, the user credentials entered by the user through the new user interface;
   determining, by the client computer, whether the user credentials entered by the user through the new user interface match original user credentials entered when the user initially accessed the web-based application;
   if the new and original user credentials match, then transmitting, from the client computer to the server, the user credentials entered by the user through the new user interface and a request to validate the user based on whether the user credentials entered by the user through the new user interface are valid;
      receiving, by the client computer, an instruction to remove the new user interface; and
      upon receiving the instruction to remove the new user interface, the client computer transforming a display of the web-based application by removing the new user interface; and
   if the new and original user credentials do not match, the client computer then displaying an error message.

2. The computer-implemented method of claim 1, wherein determining that the user has been logged off from the web-based application comprises identifying that a previous authentication token has expired or has been deleted.

3. The computer-implemented method of claim 1, wherein the user is logged off from the web-based application as a result of a passive log off.

4. The computer-implemented method of claim 1, wherein the new user interface blocks user access to a server-side representation of the web-based application through the web browser and permits access to a local representation of that web-based application through the web browser.

5. The computer-implemented method of claim 1, wherein subsequent requests by the web browser to access the web-based application include a new authentication token.

6. The computer-implemented method of claim 5, wherein the new authentication token is contained in a browser cookie.

7. The computer-implemented method of claim 1, wherein a state of a local representation of the web-based application displayed on the web browser after the new user interface is removed is the same as a state of the local representation of the web-based application displayed on the web browser prior to the new user interface being provided.

8. The computer-implemented method of claim 1, the computer-implemented method comprising further computer-implemented operations for:
   maintaining a second token indicating whether a document edited by the user through the web-based application has been remotely edited by another user since the document was last loaded;
   determining whether the second token indicates that the document has been remotely edited by the other user since the document was last loaded; and
   upon determining that the second token indicates that the document has been remotely edited by the other user since the document was last loaded, providing a message notifying the user to take preventative measures to save any content entered into a local representation of the web-based application.

9. A client computer system that operates with a server computer system, the client computer system comprising:
   a processor;
   a memory operatively coupled to the processor; and
   a program module (i) which executes in the processor from the memory and (ii) which, when executed by the processor, causes the client computer system to establish identity through a web-based application by:
      allowing a user to log on to a web-based application on the server computer system through a web browser by allowing the user to enter user credentials, the web-based application having an authentication token;
      determining whether the user has been logged off from the web-based application,
      responsive to determining that the user has been logged off from the web-based application by identifying that the authentication token has expired or has been deleted, providing a new user interface through the web browser without user initiation, the new user interface enabling the user to enter user credentials,
      receiving new user credentials entered by the user through the new user interface,
      determining whether the new user credentials entered by the user through the new user interface match original user credentials entered when the user initially accessed the web-based application,
      if the new and original user credentials match, then transmitting, to the server computer system, the new user credentials entered by the user through the new user interface and a request to validate the user based on whether the new user credentials entered by the user through the new user interface are valid,
         receiving an instruction to remove the new user interface and receiving a notification that the user has been validated, and
         upon receiving the instruction to remove the new user interface and the notification that the user has been validated, transforming a display of the web-based application by removing the new user interface; and
      if the new and original user credentials do not match, then displaying an error message.

10. The client computer system of claim 9, wherein the instruction to remove the new user interface is received from a web page to which the new user interface is directed.

11. The client computer system of claim 9, the program module, wherein the new user interface blocks user access to a server-side representation of the web-based application through the web browser and permits access to a local representation of the web-based application through the web browser.

12. The client computer system of claim 9, wherein subsequent requests by the web browser to access the web-based application includes a new authentication token.

13. The client computer system of claim 12, wherein the new authentication token is contained in a browser cookie.

14. The client computer system of claim 9, wherein the program module, when executed by the processor, further causes the computer system to establish identity through a web-based application by:
  maintaining a second token indicating whether a document edited by the user through the web-based application has been remotely edited by another user since the document was last loaded,
  determining whether the second token indicates that the document has been remotely edited by the other user since the document was last loaded, and
  upon determining that the second token indicates that the document has been remotely edited by the other user since the document was last loaded, providing a message notifying the user to take preventative measures to save any content entered into a local representation of the web-based application.

15. A computer-storage medium comprising one of an optical disk, a magnetic storage device or a solid state storage device having computer-executable instructions stored thereon which, when executed by a client computer, cause the client computer to:
  allow a user to log on to a web-based application through a web browser by allowing the user to enter user credentials, the web-based application having an authentication token;
  determine whether the user has been logged off from the web-based application, the user being logged off as a result of a passive log off or an active log off;
  responsive to determining that the user has been logged off from the web-based application by identifying that a previous authentication token has expired or has been deleted, provide a new user interface through the web browser without user initiation, the new user interface enabling the user to enter user credentials, the new user interface configured to block user access to a server-side representation of the web-based application through the web browser;
  receive the user credentials entered by the user through the new user interface,
  determine whether the user credentials entered by the user through the new user interface match original user credentials entered when the user initially accessed the web-based application,
  if the new and original credentials match, then transmit, to an authentication server, the new user credentials entered by the user through the new user interface and a request to validate the user based on whether the new user credentials entered by the user through the new user interface are valid;
  receive an instruction to remove the new user interface, wherein the instruction to remove the new user interface is received from a web page to which new user interface is directed by the authentication server;
  upon receiving the instruction to remove the new user interface, transform a display of the web-based application by removing the new user interface; and
  if the new and original credentials do not match, then displaying an error message.

* * * * *